(12) United States Patent
Shiratsuchi

(10) Patent No.: US 10,762,383 B2
(45) Date of Patent: Sep. 1, 2020

(54) PATTERN INSPECTION APPARATUS AND PATTERN INSPECTION METHOD

(71) Applicant: NuFlare Technology, Inc., Yokohama-shi (JP)

(72) Inventor: Masataka Shiratsuchi, Kawasaki (JP)

(73) Assignee: NuFlare Technology, Inc., Yokohama-shi (JP)

(*) Notice: Subject to any disclaimer, the term of this patent is extended or adjusted under 35 U.S.C. 154(b) by 102 days.

(21) Appl. No.: 16/027,756

(22) Filed: Jul. 5, 2018

(65) Prior Publication Data

US 2019/0026596 A1 Jan. 24, 2019

(30) Foreign Application Priority Data

Jul. 19, 2017 (JP) ................................ 2017-139943

(51) Int. Cl.
*G06K 9/62* (2006.01)
*G06T 7/00* (2017.01)
*G06T 7/12* (2017.01)

(52) U.S. Cl.
CPC ............ *G06K 9/6206* (2013.01); *G06T 7/001* (2013.01); *G06T 7/12* (2017.01); *G06K 2209/19* (2013.01); *G06T 2207/30121* (2013.01); *G06T 2207/30148* (2013.01)

(58) Field of Classification Search
CPC ......... G06K 9/6206; G06T 7/12; G06T 7/001; G06T 2207/30148
See application file for complete search history.

(56) References Cited

U.S. PATENT DOCUMENTS

| 6,868,175 B1 | 3/2005 | Yamamoto et al. |
| 9,098,893 B2 * | 8/2015 | Dalla-Torre ............ G06T 7/001 |
| 9,367,911 B2 | 6/2016 | Dalla-Torre et al. |
| 10,041,892 B2 | 8/2018 | Shiratsuchi et al. |

(Continued)

FOREIGN PATENT DOCUMENTS

| JP | 3524853 | 5/2004 |
| JP | 2018-17571 | 2/2018 |
| KR | 10-2016-0029421 A | 3/2016 |

OTHER PUBLICATIONS

Taiwanese Office Action and Search Report dated Jun. 28, 2019, in Patent Application No. 107120706, 13 pages (with unedited computer generated English translation).

(Continued)

*Primary Examiner* — David F Dunphy
(74) *Attorney, Agent, or Firm* — Oblon, McClelland, Maier & Neustadt, L.L.P.

(57) ABSTRACT

According to one aspect of the present invention, a pattern inspection apparatus includes reference outline creation processing circuitry configured to create a reference outline of a reference figure pattern, which serves as a reference, by using pattern data of a design pattern that serves as a base of a figure pattern formed on a substrate; outline extraction processing circuitry configured to extract an outline of the figure pattern in the measurement image from the measurement image using, as starting points, a plurality of points that are positioned on the reference outline; and comparison processing circuitry configured to compare the reference outline with the outline of the figure pattern.

8 Claims, 10 Drawing Sheets

(56) References Cited

U.S. PATENT DOCUMENTS

| | | | |
|---|---|---|---|
| 2012/0257039 A1* | 10/2012 | Abe | G06T 7/187 |
| | | | 348/79 |
| 2012/0290990 A1* | 11/2012 | Toyoda | G03F 1/86 |
| | | | 716/52 |
| 2014/0212024 A1* | 7/2014 | Chen | G06T 7/001 |
| | | | 382/149 |
| 2015/0146966 A1* | 5/2015 | Weisbuch | G06T 5/50 |
| | | | 382/145 |
| 2016/0071261 A1* | 3/2016 | Yang | H01L 22/12 |
| | | | 382/149 |
| 2017/0039698 A1* | 2/2017 | Usui | G06T 7/0006 |
| 2018/0031498 A1 | 2/2018 | Shiratsuchi et al. | |
| 2018/0293721 A1* | 10/2018 | Gupta | G06N 20/00 |

OTHER PUBLICATIONS

Korean Office Action dated Feb. 10, 2020 in Patent Application No. 10-2018-0082918, (with unedited computer generated English translation), 9 pages.

* cited by examiner

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2017-139943 filed on Jul. 19, 2017 in Japan, the entire contents of which are incorporated herein by reference.

BACKGROUND OF THE INVENTION

Field of the Invention

The present invention relates to a pattern inspection apparatus and a pattern inspection method. For example, the present invention relates to an inspection apparatus that inspects a figure pattern on a substrate.

Related Art

In recent years, as large scale integrated circuits (LSIs) are highly integrated and are increased in capacity, the width of a line of the circuit required for semiconductor elements has been gradually reduced. Patterns are exposed and transferred onto a wafer using an original figure, in which circuit patterns are formed (also referred to as a mask or a reticle. Hereinafter, generically referred to as a mask), to forma circuit by a reduction-projection exposure device that is a so-called stepper. In this way, these semiconductor elements are manufactured.

Further, the improvement of a yield is indispensable in the manufacture of LSI that requires a lot of manufacturing cost. However, patterns of LSI have a size of nanometer order from submicron order as typified by 1 gigabit-class DRAM (Random Access Memory). In recent years, the dimensions of a defect, which should be detected as a pattern defect, have become very small with a reduction in dimensions of LSI patterns to be formed on a semiconductor wafer. Accordingly, the accuracy of a pattern inspection apparatus, which inspects defects of ultrafine patterns transferred onto a semiconductor wafer, needs to be high. In addition, examples of one of critical factors that lower a yield include a pattern defect of a mask that is used to expose and transfer ultrafine patterns onto a semiconductor wafer by photolithography. For this reason, the accuracy of the pattern inspection apparatus, which inspects defects of a transfer mask used for the manufacture of LSI, needs to be high.

An method of inspecting a pattern by comparing an optical image of a pattern formed on a substrate, such as a semiconductor wafer or a lithography mask, which is taken at a predetermined magnification using a magnifying optical system, with design data or an optical image of the same pattern formed on a target object is known as an inspection method. For example, examples of a pattern inspection method includes: "die-to-die inspection" for comparing optical image data of the same patterns formed at different positions on the same mask; and "die-to-database inspection" for inputting pattern writing data (design pattern data), which is converted into a device-input format to be input by a pattern writing device, to an inspection apparatus in a case in which the pattern of CAD data designed as a pattern is to be written on a mask, creating design image data (reference image) on the basis of the pattern writing data, and comparing the design image data with an optical image of the measured data obtained from a pattern. In the inspection method of the inspection apparatus, a substrate to be inspected is placed on a stage, a target object is scanned with light flux through the movement of the stage, and the substrate is inspected. The substrate to be inspected is irradiated with light flux by a light source and an illumination optical system. Light, which is transmitted through or reflected from the substrate to be inspected, forms an image on a sensor through an optical system. An image, which is taken by the sensor, is sent to a comparator circuit as measured data. The comparator circuit compares the measured data with the reference data according to an appropriate algorithm after positioning images, and determines that the pattern has a defect in a case in which the measured data and the reference data do not coincide with each other.

In the above-mentioned pattern inspection apparatus, the substrate to be inspected is irradiated with laser beams and the transmission image or reflected image of the substrate is taken to acquire an optical image. In contrast, an inspection apparatus, which acquires the image of a pattern by irradiating a substrate to be inspected with multiple beams used as electron beams and detecting secondary electrons corresponding to each beam emitted from the substrate to be inspected, is also being developed.

For example, an electron beam inspection attracts attention since high accuracy is obtained with a smaller amount of processing in defect inspection based on the shape of the outline of a pattern. In the past, a technique, which separately performs processing for extracting an outline from design data and processing for extracting an outline from an inspection image, obtains a correspondence relationship through processing for matching the outlines, and inspects a pattern, has been disclosed as a technique for performing die-to-database inspection based on the shape of an outline (for example, Japanese Patent No. 3,524,853).

However, since the amount of matching processing for finding a correspondence relationship between two outline images is large and the size of processing circuitry for the matching processing is large, a simpler processing method is desired.

BRIEF SUMMARY OF THE INVENTION

According to one aspect of the present invention, a pattern inspection apparatus includes:

a measurement image acquisition mechanism configured to acquire a measurement image, which is a secondary electron image or an optical image of a figure pattern, from a substrate on which the figure pattern is formed by using electron beams or laser beams;

reference outline creation processing circuitry configured to create a reference outline of a reference figure pattern, which serves as a reference, by using pattern data of a design pattern that serves as a base of the figure pattern formed on the substrate;

outline extraction processing circuitry configured to extract an outline of the figure pattern in the measurement image from the measurement image using, as starting points, a plurality of points that are positioned on the reference outline; and comparison processing circuitry configured to compare the reference outline with the outline of the figure pattern.

According to another aspect of the present invention, a pattern inspection apparatus includes:

a measurement image acquisition mechanism configured to acquire first and second measurement images, which are secondary electron images or optical images of same first and second figure patterns, from a substrate on which the same first and second figure patterns are formed at different positions by using electron beams or laser beams;

reference outline creation processing circuitry configured to create a reference outline of a reference figure pattern, which serves as a reference, by using the first measurement image of the first figure pattern;

first outline extraction processing circuitry configured to extract an outline of the first figure pattern in the first measurement image from the first measurement image using, as starting points, a plurality of points that are positioned on the reference outline;

second outline extraction processing circuitry configured to extract an outline of the second figure pattern in the second measurement image from the second measurement image using, as starting points, the plurality of points that are positioned on the reference outline; and comparison processing circuitry configured to compare the outline of the first figure pattern with the outline of the second figure pattern.

According to yet another aspect of the present invention, a pattern inspection method includes:

acquiring a measurement image, which is a secondary electron image or an optical image of a figure pattern, from a substrate on which the figure pattern is formed by using electron beams or laser beams;

creating a reference outline of a reference figure pattern, which serves as a reference of the figure pattern of the measurement image, by using pattern data of a design pattern that serves as a base of the figure pattern formed on the substrate;

extracting an outline of the figure pattern in the measured image from the measured image using, as starting points, a plurality of points that are positioned on the reference outline; and comparing the reference outline with the outline of the figure pattern and outputting results.

According to yet another aspect of the present invention, a pattern inspection method includes:

acquiring first and second measurement images, which are secondary electron images or optical images of same first and second figure patterns, from a substrate on which the same first and second figure patterns are formed at different positions by using electron beams or laser beams;

creating a reference outline of a reference figure pattern, which serves as a reference, by using the first measurement image of the first figure pattern;

extracting an outline of the first figure pattern in the first measurement image from the first measurement image using, as starting points, a plurality of points that are positioned on the reference outline;

extracting an outline of the second figure pattern in the second measurement image from the second measurement image using, as starting points, the plurality of points that are positioned on the reference outline; and comparing the outline of the first figure pattern with the outline of the second figure pattern and outputting results.

DETAILED DESCRIPTION OF THE INVENTION

An inspection apparatus and an inspection method, which can inspect the outline of a measurement image without requiring matching processing for finding a correspondence relationship between two outline images, will be described in an embodiment below.

Further, a case in which a substrate to be inspected is irradiated with multiple beams formed of electron beams to take a secondary electron image will be described in the embodiment below as an example of a method of taking the image of a pattern formed on a substrate to be inspected (acquiring a measurement image). However, the invention is not limited thereto. For example, a case in which a substrate to be inspected is irradiated with a single beam formed of one electron beam to take a secondary electron image (to acquire a measurement image) may be provided as a method of taking the image of a pattern formed on a substrate to be inspected. Further, the image of a substrate to be inspected is acquired using electron beams (multiple beams) in the embodiment, but the invention is not limited thereto. The invention can be applied to a case in which the image of a substrate to be inspected is acquired using laser beams.

First Embodiment

Figure 1:
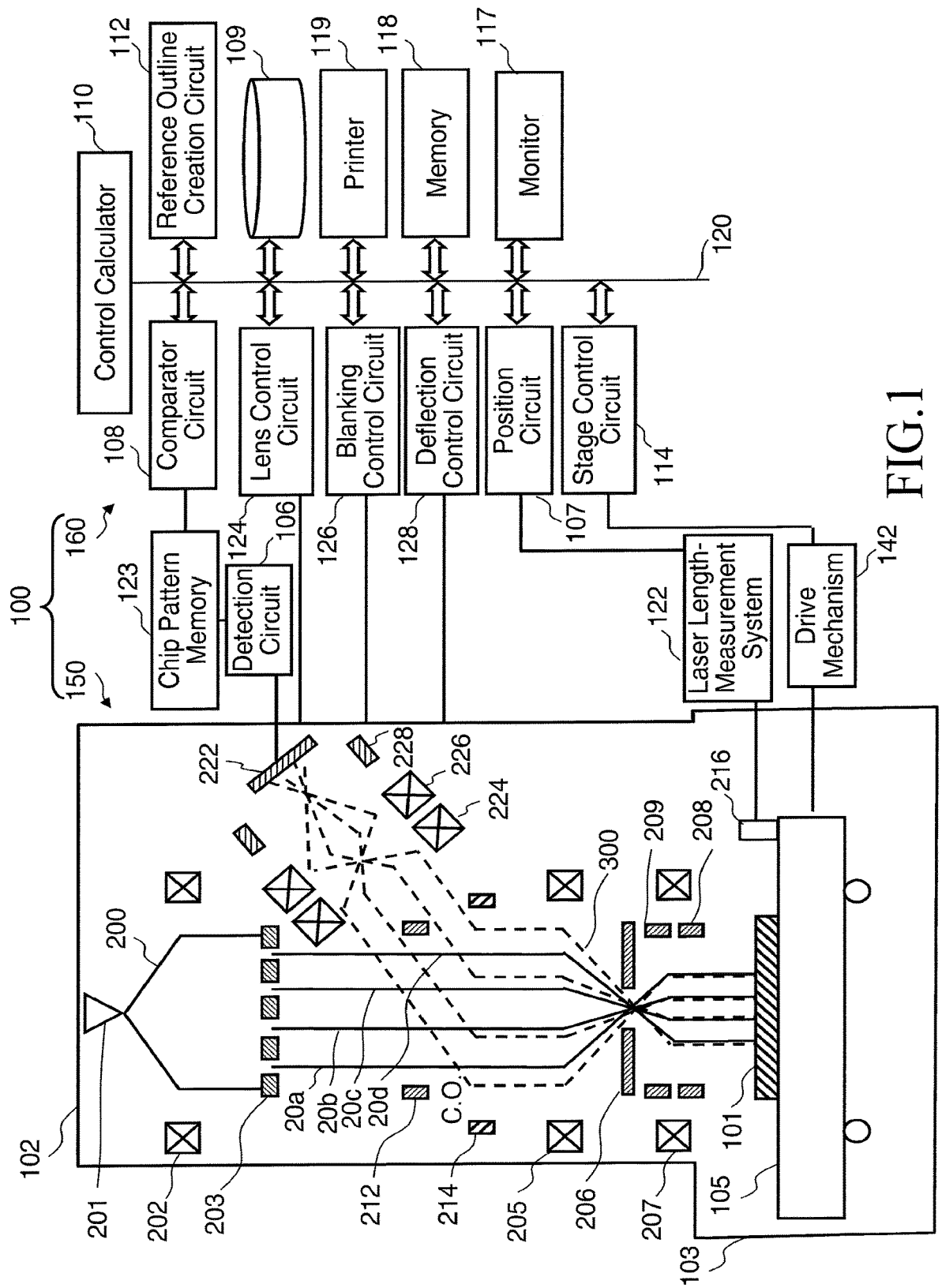
FIG. 1 is a diagram illustrating the configuration of a pattern inspection apparatus of a first embodiment.

FIG. 1 is a diagram illustrating the configuration of a pattern inspection apparatus of a first embodiment. In FIG. 1, an inspection apparatus 100, which inspects a pattern formed on a substrate, is an example of an electron beam inspection apparatus. The inspection apparatus 100 includes a measurement image acquisition mechanism 150 and a control system circuit 160 (control unit). The measurement image acquisition mechanism 150 includes an electron beam column 102 (electron optical column), an inspection chamber 103, a detection circuit 106, a chip pattern memory 123, a drive mechanism 142, and a laser length-measurement system 122. An electron gun assembly 201, an illumination lens 202, a shaping aperture array substrate 203, a reducing lens 205, a limiting aperture substrate 206, an objective lens 207, a main deflector 208, a sub-deflector 209, a collective blanking deflector 212, a beam separator 214, projection lenses 224 and 226, a deflector 228, and a multi-detector 222 are disposed in the electron beam column 102.

An X-Y stage 105, which can be moved on at least an X-Y plane, is disposed in the inspection chamber 103. A substrate 101, which is an object to be inspected, is disposed on the X-Y stage 105. Examples of the substrate 101 include a mask substrate for exposure and a semiconductor substrate, such as a silicon wafer. In a case in which the substrate 101 is a semiconductor substrate, a plurality of chip patterns (wafer dies) are formed on the semiconductor substrate. In a case in which the substrate 101 is a mask substrate for exposure, a chip pattern is formed on the mask substrate for exposure. The chip pattern formed on the mask substrate for exposure is exposed and transferred to a semiconductor substrate several times, so that a plurality of chip patterns (wafer dies) are formed on the semiconductor substrate. A case in which the substrate 101 is a semiconductor substrate will be mainly described below. The substrate 101 is disposed on the X-Y stage 105 so that, for example, the pattern formation surface of the substrate 101 faces upward. Further, a mirror 216, which reflects a laser beam for laser length-measurement applied from the laser length-measurement system 122 disposed outside the inspection chamber 103, is disposed on the X-Y stage 105. The multi-detector 222 is connected to the detection circuit 106 on the outside of the electron beam column 102. The detection circuit 106 is connected to the chip pattern memory 123.

In the control system circuit 160, a control calculator 110, which controls the entire inspection apparatus 100, is connected to a position circuit 107, a comparator circuit 108, a reference outline creation circuit 112, a stage control circuit 114, a lens control circuit 124, a blanking control circuit 126, a deflection control circuit 128, a storage device 109, such as a magnetic disk device, a monitor 117, a memory 118, and a printer 119 through a bus 120.

Further, the chip pattern memory 123 is connected to the comparator circuit 108. Furthermore, the X-Y stage 105 is driven by the drive mechanism 142 under the control of the stage control circuit 114. A drive system, such as three-axis (X-Y-θ) motors to be driven in, for example, an x direction, a y direction, and a θ direction, is provided in the drive mechanism 142, so that the X-Y stage 105 can be moved. For example, a step motor can be used as each of the X motor, the Y motor, and the θ motor (not illustrated). The X-Y stage 105 can be moved in horizontal directions and rotational direction by the X motor, the Y motor, and the θ motor. Further, the movement position of the X-Y stage 105 is measured by the laser length-measurement system 122, and is supplied to the position circuit 107. The laser length-measurement system 122 receives light reflected from the mirror 216 to measure the position of the X-Y stage 105 according to the principle of laser interferometry.

A high-voltage power supply circuit (not illustrated) is connected to the electron gun assembly 201, an acceleration voltage is applied between an extraction electrode and a filament (not illustrated) provided in the electron gun assembly 201 from a high-voltage power supply circuit, a voltage is applied to a predetermined extraction electrode (Wehnelt cylinder), and a cathode is heated to a predetermined temperature, so that an electron group emitted from the cathode is accelerated and is emitted as an electron beam 200. For example, an electromagnetic lens is used as each of the illumination lens 202, the reducing lens 205, the objective lens 207, and the projection lenses 224 and 226, and these lenses are controlled by the lens control circuit 124. Further, the beam separator 214 is also controlled by the lens control circuit 124. Each of the collective blanking deflector 212 and the deflector 228 is formed of an electrode group having at least two poles, and is controlled by the blanking control circuit 126. Each of the main deflector 208 and the sub-deflector 209 is formed of an electrode group having at least four poles, and is controlled by the deflection control circuit 128.

Here, components required to describe the first embodiment are illustrated in FIG. 1. The inspection apparatus 100 may include other components that are generally required.

Figure 2:
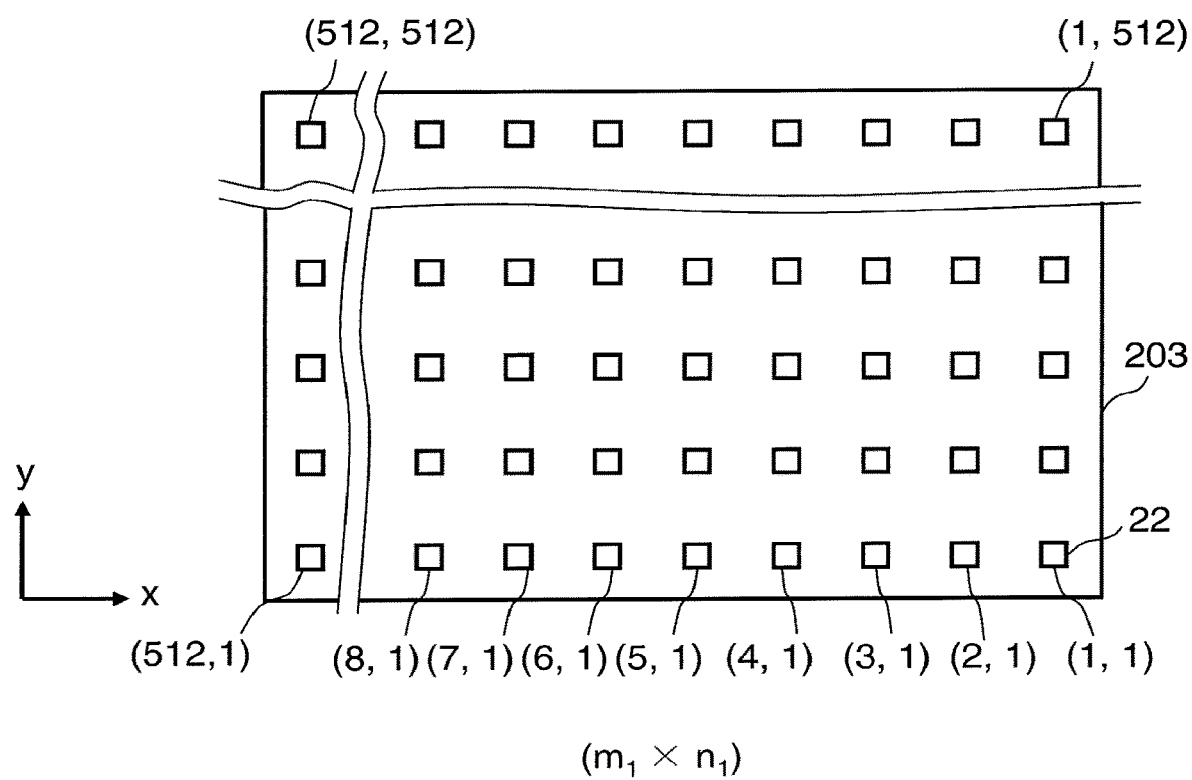
FIG. 2 is a conceptual diagram illustrating the structure of a shaping aperture array substrate of the first embodiment.

FIG. 2 is a conceptual diagram illustrating the structure of the shaping aperture array substrate of the first embodiment. In FIG. 2, two-dimensional "$m_1$ rows (x direction)×$n_1$ columns (y direction)" ($m_1$ and $n_1$ are integer equal to or larger than 2) holes (opening portions) 22 are formed in the shaping aperture array substrate 203 at a predetermined array pitch in the x and y directions. A case in which "512×512" holes (opening portions) 22 are formed is illustrated in an example of FIG. 2. The respective holes 22 are formed in a rectangular shape having the same dimensions. Alternatively, the respective holes 22 may be formed in a circular shape having the same outer diameter. A part of the electron beam 200 passes through the plurality of holes 22, so that multiple beams 20 are formed. An example in which the holes 22 of an array having two or more rows (x direction) and two or more columns (y directions) are arranged is illustrated here, but the array of the holes is not limited thereto. For example, one of the row and column (x and y directions) may be formed of a plurality of lines and the other thereof may be formed of one line. Further, a method of arraying the holes 22 is not limited to a case in which rows and columns are arranged in the form of a lattice as illustrated in FIG. 2. For example, holes of a k-th row in a length direction (y direction) and holes of a (k+1)-th row in the length direction may be arranged so as to be shifted from each other by a distance a in a width direction (x direction). Likewise, holes of a (k+1)-th row in the length direction (y direction) and holes of a (k+2)-th row in the length direction may be arranged so as to be shifted from each other by a distance b in the width direction (x direction). Next, the operation of the measurement image acquisition mechanism 150 of the inspection apparatus 100 will be described.

The entire shaping aperture array substrate 203 is illuminated with the electron beam 200, which is emitted from the electron gun assembly 201 (emission source), by the illumination lens 202 so that the electron beam 200 is substantially perpendicular to the shaping aperture array substrate 203. The plurality of rectangular holes 22 (opening portions) are formed in the shaping aperture array substrate 203 as illustrated in FIG. 2, and a region in which all the plurality of holes 22 are included is illuminated with the electron beam 200. Each of portions of the electron beam 200, which is applied to the positions of the plurality of holes 22, passes through a corresponding hole 22 of the plurality of holes 22 of the shaping aperture array substrate 203, so that, for example, a plurality of rectangular electron beams (multiple beams) 20a to 20d (solid lines of FIG. 1) are formed.

Then, after the formed multiple beams 20a to 20d form a crossover (C.O.) and pass through the beam separator 214 disposed at the position of the crossover of the multiple beams 20, the multiple beams 20a to 20d are reduced by the reducing lens 205 and travel toward a center hole formed in the limiting aperture substrate 206. Here, in a case in which all the multiple beams 20a to 20d are collectively deflected by the collective blanking deflector 212 that is disposed between the shaping aperture array substrate 203 and the reducing lens 205, the positions of the multiple beams 20a to 20d are shifted from the center hole of the limiting aperture substrate 206. Accordingly, the multiple beams 20a to 20d are blocked by the limiting aperture substrate 206. On the other hand, the multiple beams 20a to 20d, which are not deflected by the collective blanking deflector 212, pass through the center hole of the limiting aperture substrate 206 as illustrated in FIG. 1. Blanking control is performed by the turning-ON/OFF of the collective blanking deflector 212, so that the turning-ON/OFF of beams is collectively controlled. As described above, the limiting aperture substrate 206 blocks the multiple beams 20a to 20d that are deflected by the collective blanking deflector 212 so as to be in the turning-OFF state of beams. Then, the multiple beams 20a to 20d for inspection are formed of a beam group that is formed until the turning-OFF of beams after the turning-ON of beams and passes through the limiting aperture substrate 206. The multiple beams 20a to 20d, which have passed through the limiting aperture substrate 206, are focused on the surface of a target object 101 by the objective lens 207 to form a pattern image (beam diameter) having a desired reduction ratio, and all the multiple beams 20, which have passed through the limiting aperture substrate 206, are collectively deflected in the same direction by the main deflector 208 and the sub-deflector 209 so that irradiation positions for the respective beams on the substrate 101 are irradiated with the respective multiple beams. In such a case, all the multiple beams 20 are collectively deflected to the reference position of a mask die, which is to be scanned with the multiple beams 20, by the main deflector 208. In a case in which scanning is performed while the X-Y stage 105 is continuously moved, tracking deflection is further performed so as to follow the movement of the X-Y stage 105. Then, all the multiple beams 20 are collectively deflected by the sub-deflector 209 so that regions corresponding to the respective beams are scanned with the multiple beams. Ideally, the multiple beams 20, which are to be applied at a time, are arranged at a pitch that is obtained by multiplying the array pitch of the plurality of holes 22 of the shaping aperture array substrate 203 and the above-mentioned desired reduction ratio (1/a). In this way, the electron beam column 102 irradiates the substrate 101 with two-dimensional $m_1 \times n_1$ multiple beams 20 at a time. The flux of secondary electrons (multiple secondary electrons 300) (dotted line of FIG. 1), which corresponds to each of the multiple beams 20 and includes reflected electrons, is emitted from the substrate 101 due to the irradiation of the substrate 101 at desired positions with the multiple beams 20.

The multiple secondary electrons 300, which are emitted from the substrate 101, are refracted to the center of the multiple secondary electrons 300 by the objective lens 207, and travel toward the center hole formed in the limiting aperture substrate 206. The multiple secondary electrons 300, which have passed through the limiting aperture substrate 206, are refracted substantially in parallel to an optical axis by the reducing lens 205, and travel to the beam separator 214.

Here, the beam separator 214 generates an electric field and a magnetic field in directions, which are orthogonal to each other, on a plane orthogonal to a direction in which the multiple beams 20 travel (optical axis). The electric field applies a force in the same direction regardless of a direction in which electrons travel. In contrast, the magnetic field applies a force according to Fleming's left hand rule. For this reason, the direction of a force acting on to an electron can be changed depending on a direction in which electrons enter. Since a force caused by the electric field and a force caused by the magnetic field cancel each other in the multiple beams 20 (primary electron beams) that enter the beam separator 214 from the upper side, the multiple beams 20 travel straight downward. In contrast, since both a force caused by the electric field and a force caused by the magnetic field are applied to the multiple secondary electrons 300, which enter the beam separator 214 from the lower side, in the same direction, the multiple secondary electrons 300 are bent obliquely upward.

While the multiple secondary electrons 300, which are bent obliquely upward, are refracted by the projection lenses 224 and 226, the multiple secondary electrons 300 are projected on the multi-detector 222. The multi-detector 222 detects the projected multiple secondary electrons 300. The multi-detector 222 includes a diode-type two-dimensional sensor (not illustrated). Then, at a position on the diode-type two-dimensional sensor that corresponds to each beam of the multiple beams 20, each secondary electron of the multiple secondary electrons 300 collides with the diode-type two-dimensional sensor, generates electrons, and generates secondary electron-image data for each pixel to be described later. In a case in which the multi-detector 222 does not detect the multiple secondary electrons 300, the multiple secondary electrons 300 may be subjected to blanking deflection by the deflector 228 so that the multiple secondary electrons 300 do not reach a light receiving surface.

Figure 3:
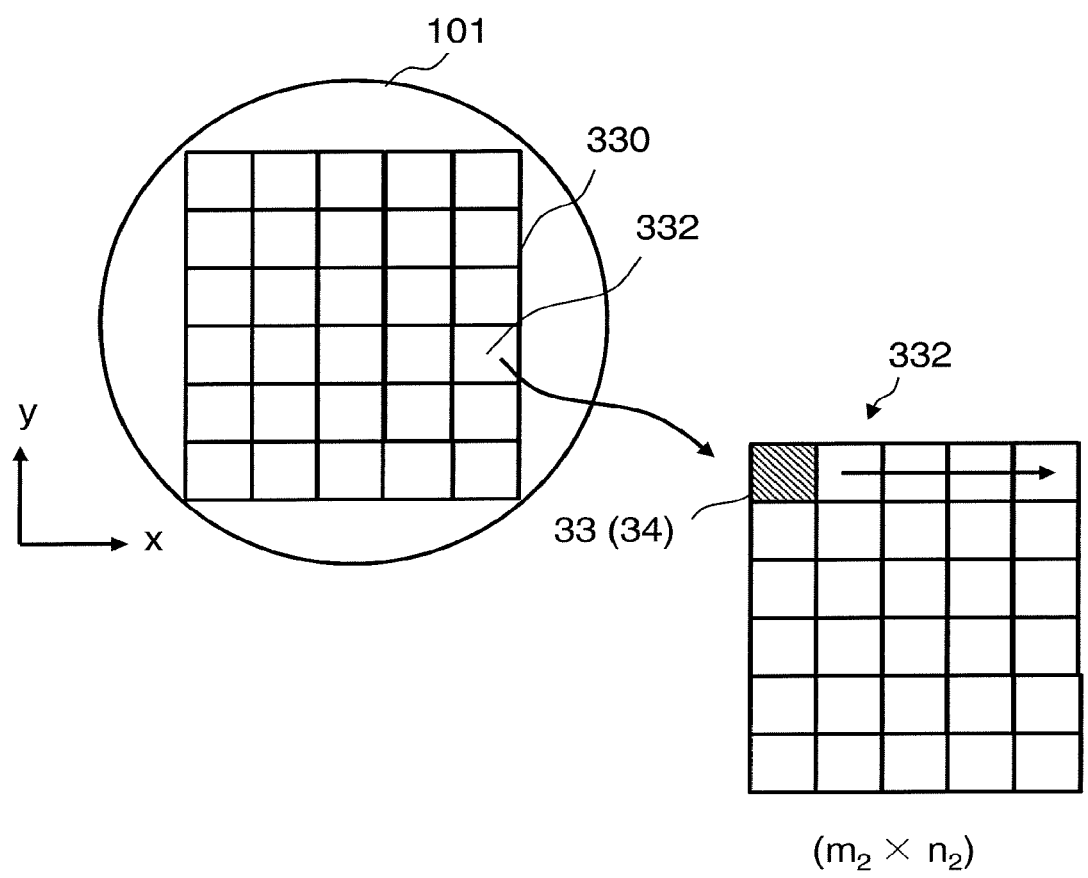
FIG. 3 is a diagram illustrating an example of a plurality of chip regions formed on a semiconductor substrate of the first embodiment.

FIG. 3 is a diagram illustrating an example of a plurality of chip regions formed on the semiconductor substrate of the first embodiment. In FIG. 3, a plurality of chips (wafer dies) 332 are formed in the shape of a two-dimensional array in an inspection region 330 of the semiconductor substrate (wafer) 101. A mask pattern, which is formed on the mask substrate for exposure and corresponds to one chip, is transferred to each chip 332 by an exposure device (stepper) (not illustrated) so as to be reduced to, for example, ¼ of the size of the mask pattern. Each chip 332 is divided into a plurality of mask dies 33, that is, two-dimensional "$m_2$ rows (x direction)×$n_2$ columns (y direction)" ($m_2$ and $n_2$ are integer equal to or larger than 2) mask dies 33. In the first embodiment, such a mask die 33 is a unit inspection region.

Figure 4:
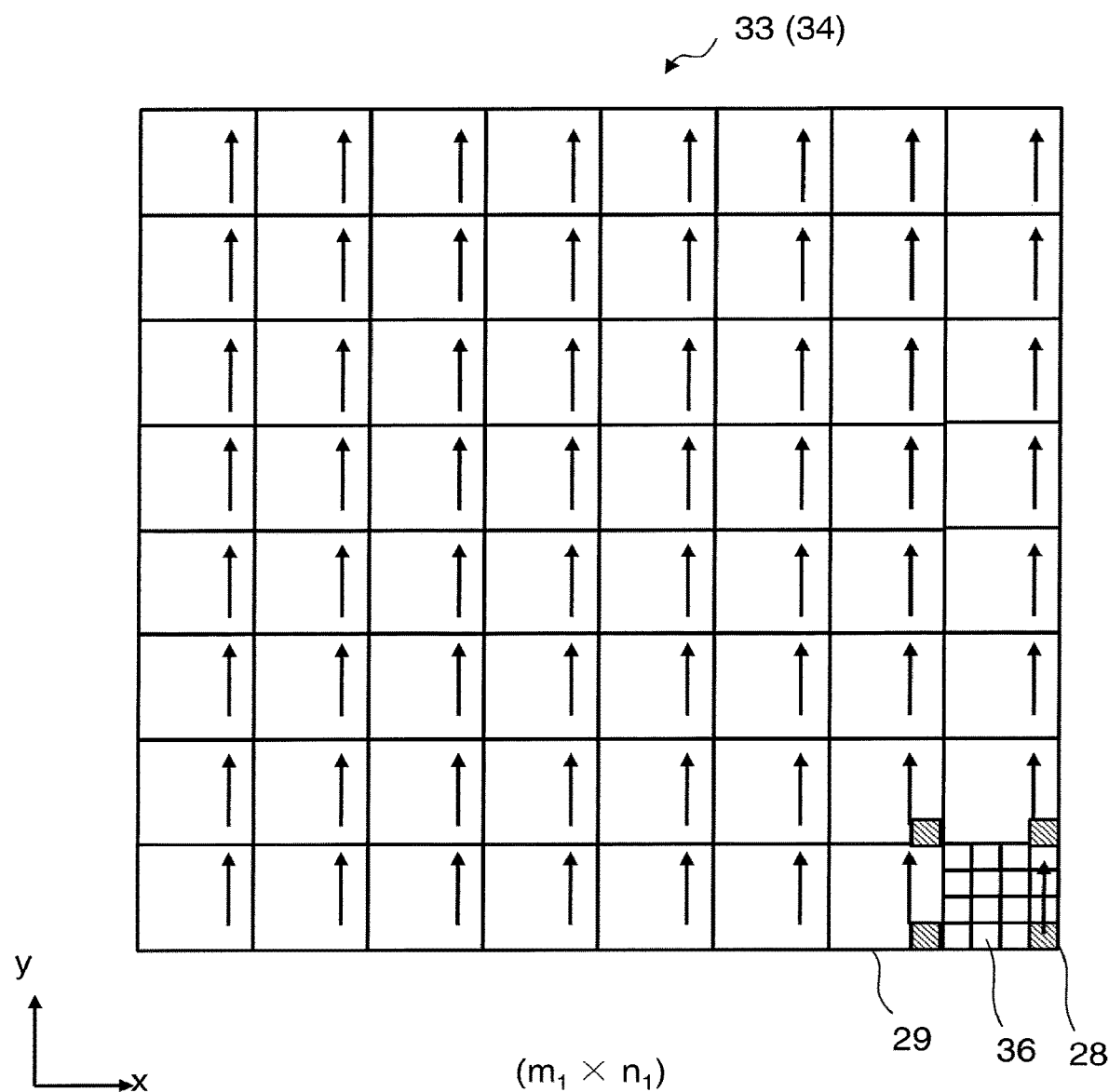
FIG. 4 is a diagram illustrating an example of irradiation regions for multiple beams and pixels for measurement of the first embodiment.

FIG. 4 is a diagram illustrating an example of irradiation regions for multiple beams and pixels for measurement of the first embodiment. In FIG. 4, each mask die 33 is divided into, for example, a plurality of mesh regions that have the shape of a mesh and the beam sizes of the multiple beams. Each of the mesh regions is a pixel 36 for measurement (unit irradiation region). The case of 8×8 multiple beams is illustrated in the example of FIG. 4. An irradiation region 34, which can be irradiated with the multiple beams 20 at a time, is defined by (x-direction size obtained by multiplying the pitch between the beams of the multiple beams 20 in the x direction and the number of beams in the x direction)×(y-direction size obtained by multiplying the pitch between the beams of the multiple beams 20 in the y direction and the number of beams in the y direction). A case in which the irradiation region 34 and the mask die 33 have the same size is illustrated in the example of FIG. 4. However, the sizes of the irradiation region 34 and the mask die 33 are not limited to this case. The irradiation region 34 may be smaller than the mask die 33. Alternatively, the irradiation region 34 may be larger than the mask die 33. Further, a plurality of pixels 28 for measurement, which can be irradiated with the multiple beams 20 at a time, (positions irradiated with beams at the time of one shot) are illustrated in the irradiation region 34. In other words, a pitch between adjacent pixels 28 for measurement is a pitch between the beams of the multiple beams. In the example of FIG. 4, one sub-irradiation region 29 is formed of a square region that is surrounded by four adjacent pixels 28 for measurement and includes one of the four pixels 28 for measurement. A case in which each sub-irradiation region 29 is formed of 4×4 pixels 36 is illustrated in the example of FIG. 4.

Each mask die 33 is subjected to scanning in a scanning operation of the first embodiment. An example of a case in which a certain mask die 33 is subjected to scanning is illustrated in the example of FIG. 4. In a case in which all the multiple beams 20 are used, $m_1 \times n_1$ sub-irradiation region 29 are arrayed in the x direction and the y directions (two-dimensionally) in one irradiation region 34. The X-Y stage 105 is moved to a position where a first mask die 33 can be irradiated with the multiple beams 20. All the multiple beams 20 are collectively deflected to the reference position of the mask die 33, which is to be scanned with the multiple beams 20, by the main deflector 208. The X-Y stage 105 is stopped at that position, and the mask die 33 is scanned (is subjected to the scanning operation) while the mask die 33 is used as the irradiation region 34. In a case in which scanning is performed while the X-Y stage 105 is continuously moved, tracking deflection is further performed by the main deflector 208 so as to follow the movement of the X-Y stage 105. The respective beams forming the multiple beams 20 are in charge of sub-irradiation regions 29 different from each other. Further, one pixel 28 for measurement corresponding to the same position in the sub-irradiation region 29 of which each beam is in charge is irradiated with each beam at the time of each shot. In the example of FIG. 4, each beam is deflected by the sub-deflector 209 so that a pixel 36 for measurement, which is the first pixel for measurement from the right, of the lowermost row of the sub-irradiation region 29 of which each beam is in charge is to be irradiated with each beam in the first shot. Then, irradiation of the first shot is performed. Subsequently, the deflection positions of all the multiple beams 20 are collectively shifted by a distance corresponding to one pixel 36 for measurement in the y direction by the sub-deflector 209, and a pixel 36 for measurement, which is the first pixel for measurement from the right, of a row, which is the second row from below, of the sub-irradiation region 29 of which each beam is in charge is irradiated with each beam in the second shot. Likewise, a pixel 36 for measurement, which is the first pixel for measurement from the right, of a row, which is the third row from below, of the sub-irradiation region 29 of which each beam is in charge is irradiated with each beam in the third shot. A pixel 36 for measurement, which is the first pixel for measurement from the right, of a row, which is the fourth row from below, of the sub-irradiation region 29 of which each beam is in charge is irradiated with each beam in the fourth shot. Next, the deflection positions of all the multiple beams 20 are collectively shifted to the position of a pixel 36 for measurement, which is the second pixel for measurement from the right, of the lowermost row by the sub-deflector 209, and, likewise, the pixels 36 for measurement are sequentially irradiated in the y direction. Such an operation is repeated and all the pixels 36 for measurement of one sub-irradiation region 29 are sequentially irradiated with one beam. In one shot, the secondary electrons 300, which correspond to a plurality of shots of which the number is equal to the number of the respective holes 22 to the maximum, are detected at a time by the multiple beams that are formed in a case in which an electron beam passes through the respective holes 22 of the shaping aperture array substrate 203.

As described above, the mask die 33 is scanned with all the multiple beams 20 while the mask die 33 is used as the irradiation region 34. However, one corresponding sub-irradiation region 29 is scanned with each beam. Then, after the scanning of one mask die 33 is completed, the next adjacent mask die 33 is moved so as to be used as the irradiation region 34 and is scanned. Such an operation is repeated and the scanning of each chip 332 is performed. Secondary electrons 300 are emitted from the pixel 36 for measurement, which is irradiated with the multiple beams 20, by the shot of the multiple beams 20 whenever the multiple beams 20 are applied, and are detected by the multi-detector 222. In the first embodiment, the size of the unit detection region of the multi-detector 222 is set to allow the secondary electrons 300, which are emitted upward from each pixel 36 for measurement, to be detected for each pixel 36 for measurement (or each sub-irradiation region 29).

Since scanning is performed using the multiple beams 20 as described above, a scanning operation (measurement) can be performed at a speed higher than the speed in a case in which scanning is performed using a single beam. Meanwhile, each mask die 33 may be scanned by a step-and-repeat operation, and each mask die 33 may be scanned while the X-Y stage 105 is continuously moved. In a case in which the irradiation region 34 is smaller than the mask die 33, a scanning operation may be performed while the irradiation region 34 is moved within the mask die 33.

In a case in which the substrate 101 is a mask substrate for exposure, a chip region, which is formed on the mask substrate for exposure and corresponds to one chip, is divided into, for example, a plurality of strip-shaped stripe regions with the size of the above-mentioned mask die 33. Then, each mask die 33 may be scanned for each stripe region by the same scanning as the above-mentioned operation. Since the size of the mask die 33 of the mask substrate for exposure is a size before transfer, the size of the mask die 33 of the mask substrate for exposure is four times larger than the size of the mask die 33 of the semiconductor substrate. For this reason, in a case in which the irradiation region 34 is smaller than the mask die 33 of the mask substrate for exposure, a scanning operation corresponding to one chip is increased (for example, four times). However, since a pattern corresponding to one chip is formed on the mask substrate for exposure, the number of times of scanning is smaller than that in the case of a semiconductor substrate on which chips more than four chips are formed.

As described above, the measurement image acquisition mechanism 150 scans the substrate 101 to be inspected, on which a figure pattern is formed, with the multiple beams 20 and detects the multiple secondary electrons 300 that are emitted from the substrate 101 to be inspected due to the irradiation of the substrate with the multiple beams 20. The detection data (secondary electron image) of the secondary electrons, which are detected by the multi-detector 222 and are emitted from each pixel 36 for measurement, is output to the detection circuit 106 in order of the measurement thereof. Analog detection data is converted into digital data by an A/D converter (not illustrated) in the detection circuit 106, and the digital data is stored in the chip pattern memory 123. Then, when detection data corresponding to, for example, one chip 332 is accumulated, the detection data is transmitted to the comparator circuit 108 together with information, which is obtained from the position circuit 107 and represents each position, as chip pattern data.

Figure 5:
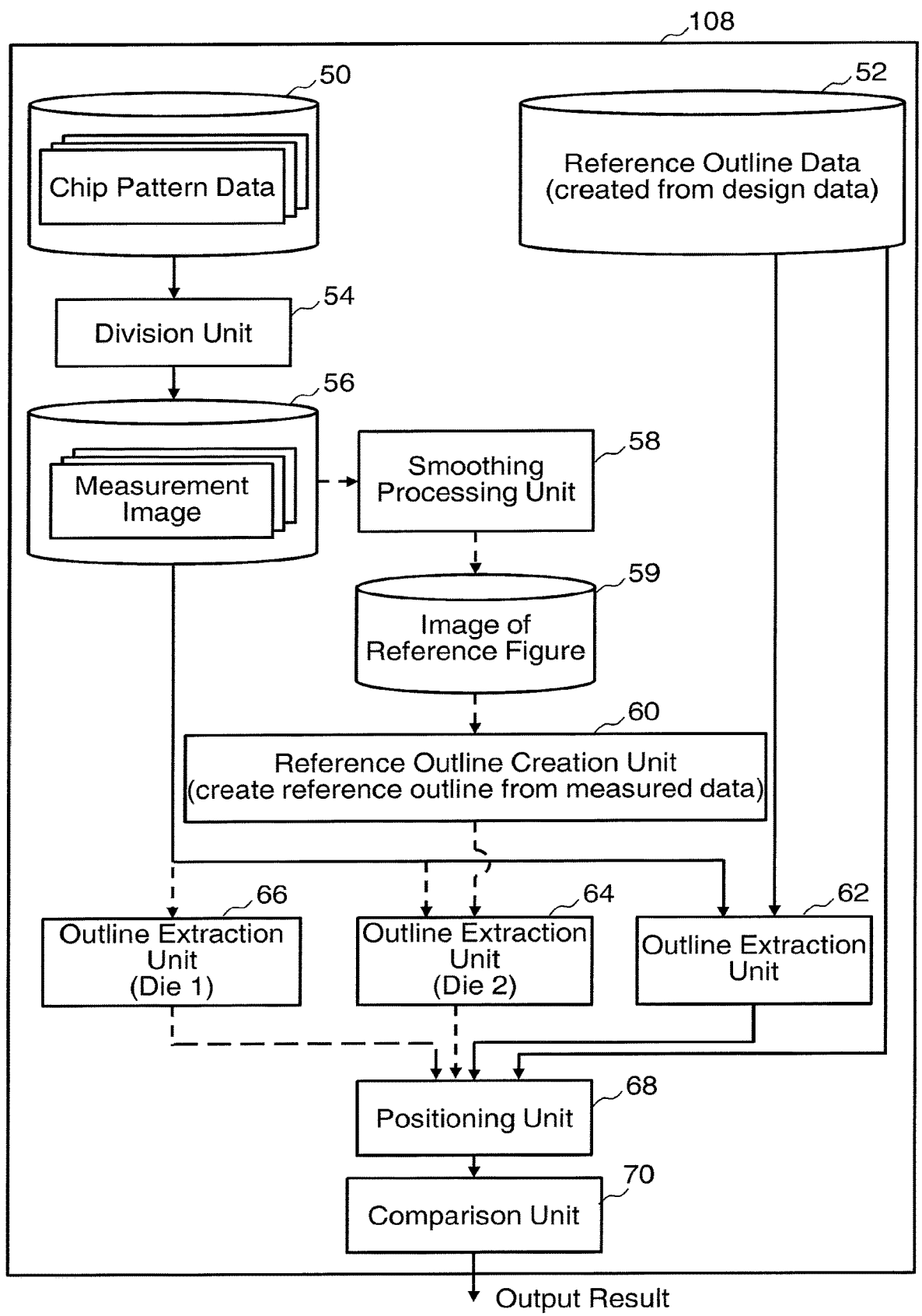
FIG. 5 is an example of a diagram illustrating the internal configuration of a comparator circuit of the first embodiment.

FIG. 5 is an example of a diagram illustrating the internal configuration of the comparator circuit of the first embodiment. In FIG. 5, storage devices 50, 52, 56, and 59, such as magnetic disk devices, a division unit 54, a smoothing processing unit 58, a reference outline creation unit 60, outline extraction units 62, 64, and 66, a positioning unit 68, and a comparison unit 70 are disposed in the comparator circuit 108. Each "~ unit" of the division unit 54, the smoothing processing unit 58, the reference outline creation unit 60, the outline extraction units 62, 64, and 66, the positioning unit 68, and the comparison unit 70 includes processing circuitry, and the processing circuitry includes an electrical circuit, a computer, a processor, a circuit board, a quantum circuit, a semiconductor device, or the like. Further, common processing circuitry (the same processing circuitry) may be used as each "~ unit". Alternatively, different processing circuitry (separate processing circuitry) may be used as each "~ unit". Input data or arithmetic results, which are required in the division unit 54, the smoothing processing unit 58, the reference outline creation unit 60, the outline extraction units 62, 64, and 66, the positioning unit 68, and the comparison unit 70, are stored in a memory (not illustrated) whenever data is input or arithmetic results are obtained.

FIG. 5 illustrates configuration that can perform both die-to-database inspection and die-to-die inspection. In a case in which only die-to-database inspection is performed and die-to-die inspection is not performed, the smoothing processing unit 58, the reference outline creation unit 60, and the outline extraction units 64 and 66 may be omitted in the configuration of FIG. 5. On the contrary, in a case in which only die-to-die inspection is performed and die-to-database inspection is not performed, the storage device 52 and the outline extraction unit 62 of the configuration of FIG. 5 and the reference outline creation circuit 112 of FIG. 1 may be omitted. Die-to-database inspection will be described first.

Figure 6:
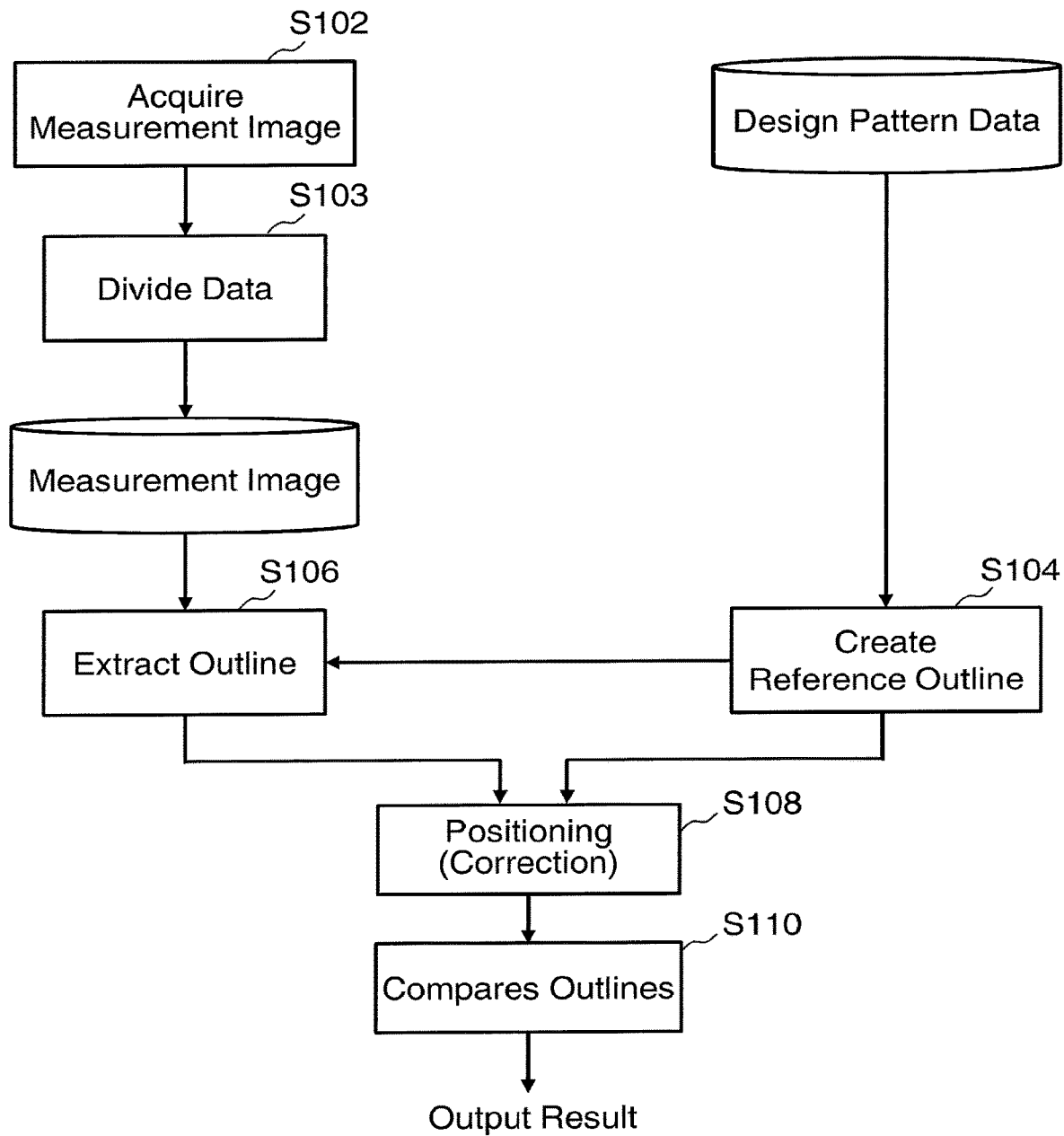
FIG. 6 is a flowchart illustrating main steps of an inspection method for die-to-database inspection of the first embodiment.

FIG. 6 is a flowchart illustrating main steps of an inspection method for die-to-database inspection of the first embodiment. In FIG. 6, the inspection method for die-to-database inspection of the first embodiment performs a series of steps, that is, a measurement image acquisition step (S102), a division step (S103), a reference outline creation step (S104), an outline extraction step (S106), a positioning step (S108), and a comparison step (S110).

In the measurement image acquisition step (S102), the measurement image acquisition mechanism 150 acquires a measurement image, which is a secondary electron image of a figure pattern from the substrate 101 on which a figure pattern is formed, using electron beams (here, multiple beams 20). The specific operation of the measurement image acquisition mechanism 150 is the same as described above. Chip pattern data, which is an example of the measurement image, is transmitted to the comparator circuit 108 as described above. The chip pattern data is stored in the storage device 50 in the comparator circuit 108.

In the division step (S103), the division unit 54 divides the chip pattern data into a plurality of mask die images (an example of the measurement image) with the size of the mask die 33 that is a unit inspection region. Each of the mask die images (an example of the measurement image) is stored in the storage device 56.

In the reference outline creation step (S104), the reference outline creation circuit 112 (reference outline creation unit) creates the reference outline of a reference figure pattern, which serves as a reference, by using the pattern data of a design pattern that serves as the base of the figure pattern formed on the substrate 101. Specifically, the reference outline creation circuit 112 operates as described below.

Figure 7A:
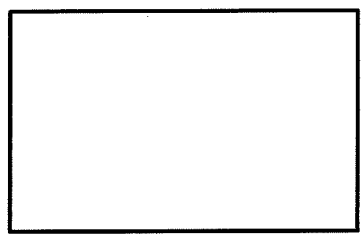
FIGS. 7A and 7B are diagrams illustrating a method of creating a reference figure pattern of the first embodiment.
Figure 7B:
Figure 7B:
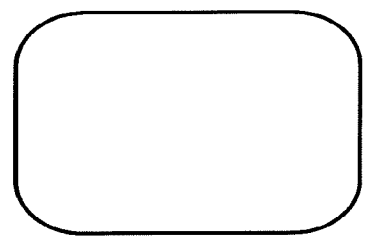

FIGS. 7A and 7B are diagrams illustrating a method of creating the reference figure pattern of the first embodiment. Further, design pattern data, which serves as the base of the figure pattern formed on the substrate 101, is input from the outside of the inspection apparatus 100 and is stored in the storage device 109. The design pattern data is defined as not image data (gradation value data) but, for example, vector data. For example, the design pattern data is defined as data, such as a figure type, the coordinates of the reference position, and the size of a figure pattern. A figure pattern on the design pattern data is defined by a rectangular shape of which corners have, for example, a right angle as illustrated in FIG. 7A. However, the figure pattern formed on the substrate 101 is not formed in a rectangular shape of which corners have, for example, a right angle. Accordingly, the reference outline creation circuit 112 creates a figure pattern, which has an outline of which corners are rounded as illustrated in FIG. 7B, for every mask die image with regard to a figure pattern on design pattern data corresponding to a figure pattern of the mask die image. The radius of curvature in a case in which corners are rounded may be set by a process parameter or the like. It is preferable that even a portion of a design pattern, which has a sufficient allowable error, is rounded without remaining as it is at the time of at least the extraction of an outline to be described later so that a straight line, which extends in a normal direction to the edge of a target figure pattern from a point positioned on the reference outline, does not cross a straight line extending from another point. The figure pattern, which has the outline of which corners are rounded, is the reference figure pattern. In other words, the reference outline creation circuit 112 creates the reference outline of a reference figure pattern for every figure pattern of the mask die image. Reference outline data of the created reference figure pattern is output to the comparator circuit 108, and is stored in the storage device 52 disposed in the comparator circuit 108.

In the outline extraction step (S106), the outline extraction unit 62 (measurement image-outline extraction unit) extracts the outline of the figure pattern in the mask die image (measurement image) from the mask die image (measurement image) using, as starting points, a plurality of points that are positioned on the reference outline. Specifically, the outline extraction unit 62 operates as described below.

Figure 8:
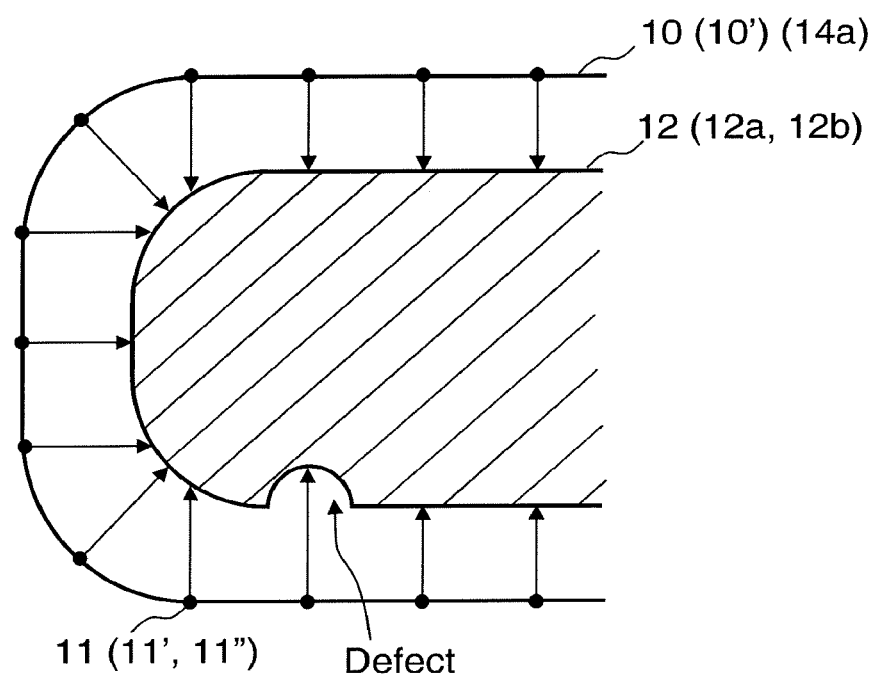
FIG. 8 is a diagram illustrating a method of extracting the outline of the figure pattern of a measurement image of the first embodiment.

FIG. 8 is a diagram illustrating a method of extracting the outline of the figure pattern of the measurement image of the first embodiment. The outline extraction unit 62 reads the mask die image (measurement image), which is an object to be inspected, from the storage device 56. Further, the outline extraction unit 62 reads the reference outline data of the reference figure pattern corresponding to the figure pattern of the mask die image, which is an object to be inspected, from the storage device 52. Since the figure pattern of the measurement image is defined as gradation value data of each pixel 36, the outline extraction unit 62 specifies the coordinates of a point 11 positioned on a reference outline 10 of the reference figure pattern for each size of, for example, one pixel 36 as illustrated in FIG. 8. Then, as illustrated in FIG. 8, the outline extraction unit 62 extracts an end portion (edge) of a figure pattern 12 of the measurement image in a normal direction of the reference outline from the coordinate position of each of a plurality of points 11 positioned on the reference outline 10 of the measurement image. The outline extraction unit 62 extracts the outline of the figure pattern 12 of the measurement image by connecting the end portions (edges) of the figure pattern 12 of the measurement image.

Figure 9A:
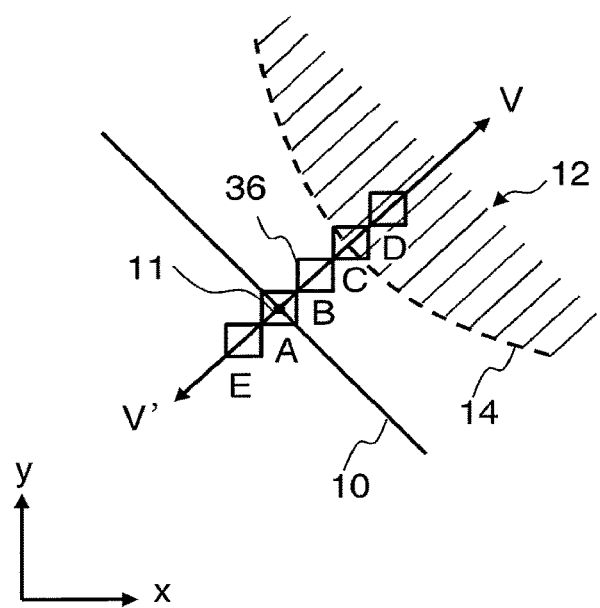
FIGS. 9A and 9B are diagrams illustrating a method of extracting an end portion (edge) of the figure pattern of the measurement image of the first embodiment.
Figure 9B:
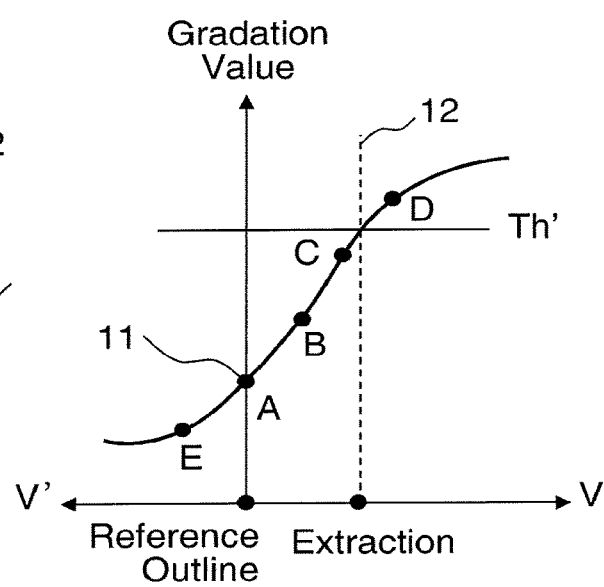

FIGS. 9A and 9B are diagrams illustrating a method of extracting an end portion (edge) of the figure pattern of the measurement image of the first embodiment. The vicinity of one point 11 positioned on the reference outline 10 is enlarged and illustrated in an example of FIG. 9A. The edge of the figure pattern 12 of the measurement image is searched, for example, by one pixel 36 pixel by pixel in the normal direction of the reference outline 10 from the same coordinates in the measurement image as the coordinates of the point 11 positioned on the reference outline 10. Even in a case in which design coordinates are applied to the measurement image, displacement between the reference outline 10 and a target figure pattern 12 can be suppressed to be equal to or smaller than the size of several pixels (for example, about three pixels). A relationship between a gradation value and a position in a search direction VV' (normal direction) is illustrated in an example of FIG. 9B. Search is started in a V direction and a V' direction (−V direction) from a pixel A corresponding to the coordinates of a point 11 positioned on the reference outline 10. In a case in which a distance between the reference outline 10 and the target figure pattern 12 is not long, the gradation value of an adjacent pixel B in a direction, which faces the target figure pattern 12 from the pixel A corresponding to the coordinates of the point 11, is close to a threshold value Th' used to determine an edge as illustrated in FIG. 9B. On the contrary, the gradation value of an adjacent pixel E in a direction, which faces the side opposite to the target figure pattern 12 from the pixel A, is away from the threshold value Th' used to determine an edge or is not changed. A case in which the reference outline 10 is positioned outside the target figure pattern 12 is illustrated in the example of FIG. 9A. For this reason, the gradation value of the adjacent pixel B becomes larger than the gradation value of the pixel A and becomes close to the threshold value Th'. Accordingly, the gradation value of the adjacent pixel E becomes a value that is smaller than or equal to the gradation value of the pixel A. On the other hand, in a case in which the reference outline 10 is positioned inside the target figure pattern 12, the gradation value of the adjacent pixel B becomes smaller than the gradation value of the pixel A and becomes close to the threshold value Th'. Accordingly, the gradation value of the adjacent pixel E becomes a value that is larger than or equal to the gradation value of the pixel A. From the above description, it can be determined that the direction facing the target figure pattern 12 from the pixel A corresponds to the pixel B side. Then, search is performed up to a pixel D, of which the gradation value exceeds (or is above) the threshold value Th' with reference to the gradation values of pixels B, C, and D, for example, by one pixel 36 pixel by pixel from the pixel A in the normal direction (V direction) of the reference outline 10. Accordingly, it is found that the end portion (edge) of the target figure pattern 12 is present between the pixels C and D. The gradation values of the pixels C and D are subjected to interpolation, such as linear interpolation, in, for example, sub-pixel, so that the position of the end portion (edge) of the target figure pattern 12 can be specified. Likewise, the outline extraction unit 62 extracts the positions of the end portions (edges) of the target figure pattern 12 with regard to the plurality of points 11 positioned on the reference outline 10. Accordingly, the outline of the target figure pattern 12 can be acquired.

In the positioning step (S108), the positioning unit 68 (alignment processing unit) performs the positioning (alignment) of the reference outline and the extracted outline of the target figure pattern 12. In this case, it is also preferred that the reference outline is corrected using a model, such as a least-square method.

Figure 10A:
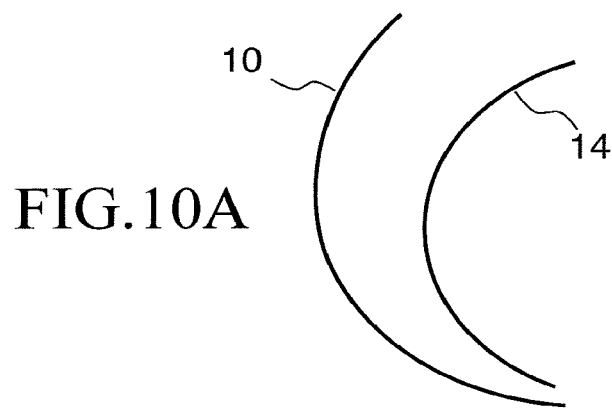
FIGS. 10A and 10B are diagrams illustrating an example of positioning correction of the first embodiment.
Figure 10B:
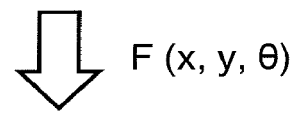
Figure 10B:
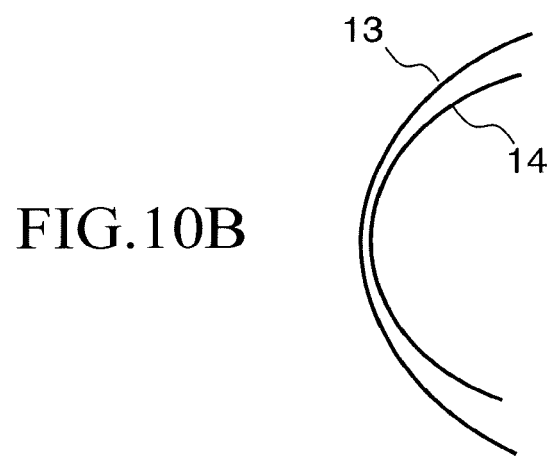

FIGS. 10A and 10B are diagrams illustrating an example of positioning correction of the first embodiment. For example, correction conversion, which allows only translation in the x and y directions and rotation (θ), is considered as positioning. An evaluation function, which represents a difference between a corrected reference outline and an extracted target figure pattern, is represented by a distance between outlines, or the like. The evaluation function is optimized by a least-square method or the like, so that the parameters of correction conversion, that is, a translation distance and a rotation angle are determined. In a case in which there are the reference outline 10 and an extracted outline 14 of the target figure pattern 12 as illustrated in FIG. 10A, the conversion of translation and rotation is used to correct the reference outline 10 to an outline 13 close to the outline 14 of the target figure pattern 12 as illustrated in FIG. 10B. Meanwhile, since the contents of correction mentioned here are limited to translation and rotation in a case in which correction is to be performed, the reference outline does not coincide with the outline of the target figure pattern including a defective portion even after correction. Accordingly, a difference in the defective portion can be clearly detected.

In the comparison step (S110), the comparison unit 70 compares the reference outline 10 with the outline 14 of the target figure pattern 12. Here, the comparison unit 70 compares the reference outline 10(13), which has been subjected to positioning (alignment), with the outline 14 of the target figure pattern 12 that has been subjected to positioning (alignment). Specifically, the comparison unit 70 operates as described below. As in the case illustrated in FIG. 8, the comparison unit 70 measures distances between the plurality of points 11 positioned on the reference outline 10(13), which has been subjected to positioning, and the outline 14 of the figure pattern 12, which has been subjected to positioning, in the normal direction of the reference outline 10(13). It is preferred that the distance is measured in sub-pixel. Then, the comparison unit 70 determines that a defect is present at a portion where a distance exceeds a determination threshold value Th in the distances between the plurality of points 11 positioned on the reference outline 10(13) and the outline 14 of the figure pattern 12 measured in the normal direction of the reference outline 10(13). Comparison results may be output by the storage device 109, the monitor 117, the memory 118, or the printer 19.

Meanwhile, significant displacement between the design pattern and the figure pattern of an actually measurement image less occurs at portions other than the defective portion. Accordingly, each of distances between the plurality of points 11 positioned on the reference outline 10 and the outline 14 of the figure pattern 12, which is obtained when the edge of the target figure pattern 12 is searched in the outline extraction step (S106), in the normal direction may be used as an object to be determined in the comparison step (S110) as it is.

As described above, in the die-to-database inspection, the edge of the target figure pattern 12, which is defined by image data, is searched in the normal direction of the reference outline 10 from the plurality of points that are positioned on the reference outline 10 created from the design pattern data defined by gradation values (pixel values) and not changed into image data and serve as starting points. Accordingly, processing for matching outlines can be made not to be required. Next, die-to-die inspection will be described.

Figure 11:
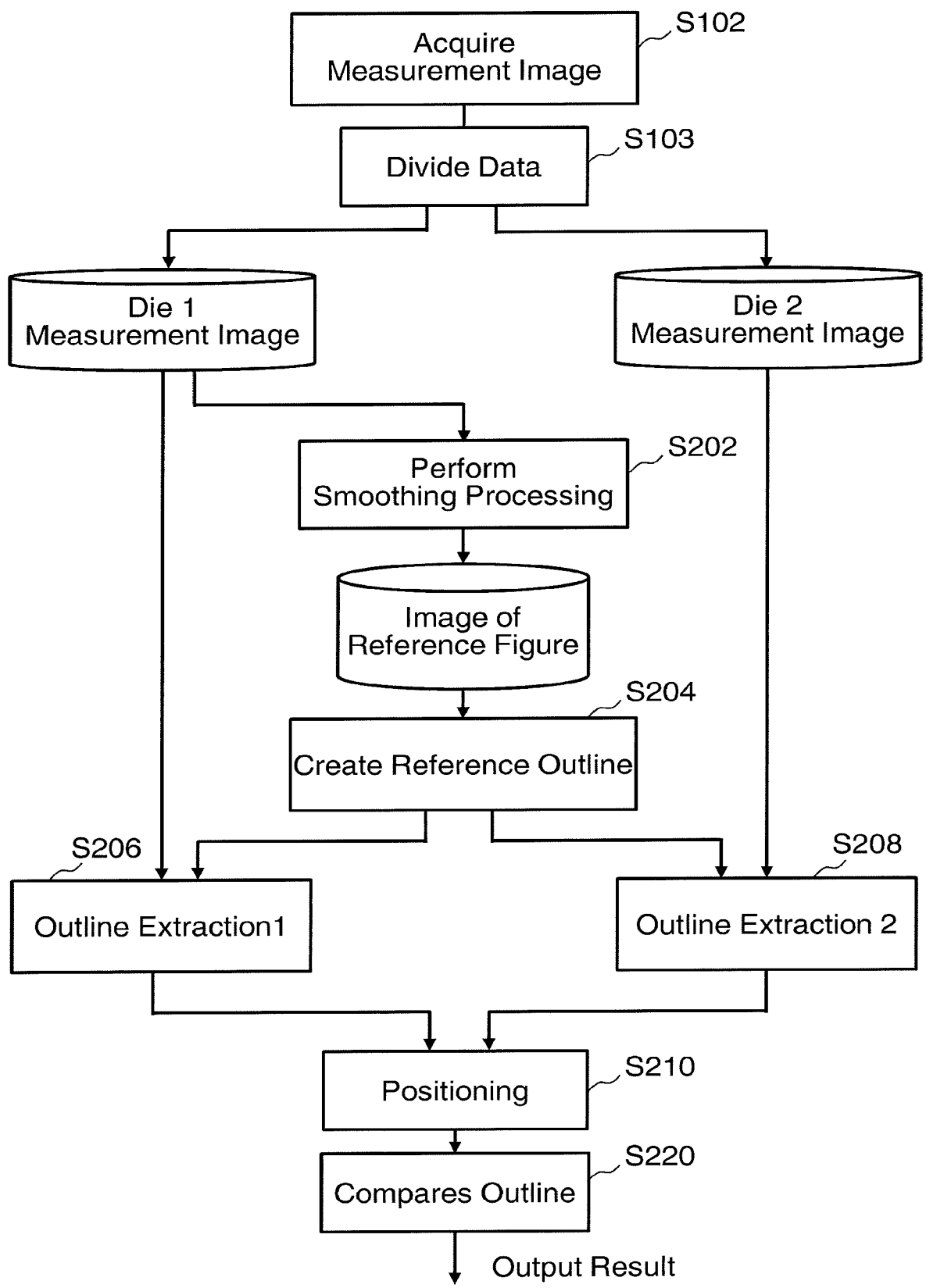
FIG. 11 is a flowchart illustrating main steps of an inspection method for die-to-die inspection of the first embodiment.

FIG. 11 is a flowchart illustrating main steps of an inspection method for die-to-die inspection of the first embodiment. In FIG. 11, the inspection method for die-to-die inspection of the first embodiment performs a series of steps, that is, a measurement image acquisition step (S102), a division step (S103), a smoothing processing step (S202), a reference outline creation step (S204), an outline extraction (1) step (S206), an outline extraction (2) step (S208), a positioning step (S210), and a comparison step (S220).

The contents of the measurement image acquisition step (S102) and the division step (S103) are the same as the above-mentioned contents. However, measurement image data, which are obtained from the same patterns formed at different positions on the same substrate 101, are compared in the die-to-die inspection. For this reason, in the measurement image acquisition step (S102), the measurement image acquisition mechanism 150 acquires measurement images, which are secondary electron images of one figure pattern (first figure pattern) and the other figure pattern (second figure pattern) from the substrate 101 on which the same figure patterns (first and second figure patterns) are formed at different positions, by using multiple beams 20 (electron beams). The acquired images of one figure pattern (first figure pattern) and the other figure pattern (second figure pattern) may be present in the same chip pattern data and may be separately present in different chip pattern data. Then, in the division step (S103), the division unit 54 cuts a mask die image (1) (first measurement image) of a mask die (1) and a mask die image (2) (second measurement image) of a mask die (2), on which the same patterns are formed, from the same chip pattern data or from different chip pattern data by division. The divided mask die image (1) (first measurement image) of the mask die (1) and the divided mask die image (2) (second measurement image) of the mask die (2) are stored in the storage device 56.

In the smoothing processing step (S202), the smoothing processing unit 58 performs smoothing processing for smoothing the end portion of a target figure pattern 12 (first figure pattern) of the mask die image (1) (first measurement image). The smoothing processing performs convolution integration of Gaussian distribution substantially having the diameter of each beam of the multiple beams 20 to remove noise generated due to the measurement (scanning) of an image. The outline of a figure pattern, which is distorted due to unevenness caused by noise, can be smoothed by such arithmetic processing. The target figure pattern 12 subjected to such smoothing processing is a reference figure pattern in the die-to-die inspection. The image data of the reference figure pattern is stored in the storage device 59.

In the reference outline creation step (S204), the reference outline creation unit 60 creates a reference outline 10' of the reference figure pattern, which serves as a reference, by using the mask die image (1) (first measurement image) of the target figure pattern 12 (first figure pattern) that is the reference figure pattern and has been subjected to smoothing processing. In the die-to-die inspection, the reference outline creation unit 60 creates the reference outline 10' from the data of the mask die image (1) that is defined by gradation values (pixel values), is changed into image data, and has been subjected to smoothing processing. As illustrated in FIG. 9B, the position of the edge of the target figure pattern 12 subjected to smoothing processing, which is the reference outline 10', is determined in sub-pixel at a position between pixels having gradation values, which are above the threshold value Th'.

In the outline extraction (1) step (S206), the outline extraction unit 64 (first measurement image-outline extraction unit) extracts an outline 14a of a target figure pattern 12a (first figure pattern) in the mask die image (1) (first measurement image) from the mask die image (1) (first measurement image) using, as starting points, a plurality of points 11', which are positioned on the reference outline 10', as illustrated in FIG. 8. A method of extracting the outline is the same as the contents described in FIGS. 8, 9A, and 9B. Meanwhile, data, which is not subjected to smoothing processing, is used as the data of the mask die image (1) (first measurement image) from which the outline is to be extracted. Alternatively, data, which is subjected to weak smoothing processing weaker (lower in level) than the smoothing processing performed in a case in which the reference figure pattern is to be created, may be used. There is a case where the position of the edge of the target figure pattern 12 can be extracted with high accuracy since noise is small when data subjected to the weak smoothing processing (=noise filtering) is used. Further, since the reference figure pattern and the target figure pattern 12a are based on the same mask die image (1) (first measurement image), there are many cases where significant displacement does not occur between the reference outline 10' and the edge of the target figure pattern 12a (first figure pattern) of the mask die image (1) (first measurement image).

In the outline extraction (2) step (S208), the outline extraction unit 66 (second measurement image-outline extraction unit) extracts an outline 14b of a target figure pattern 12b (second figure pattern) in the mask die image (2) (second measurement image) from the mask die image (2) (second measurement image) using, as starting points, the plurality of points 11', which are positioned on the reference outline 10', as illustrated in FIG. 8. A method of extracting the outline is the same as the contents described in FIGS. 8, 9A, and 9B. Meanwhile, data, which is not subjected to smoothing processing, is used as the data of the mask die image (2) (second measurement image) from which the outline is to be extracted. Alternatively, data, which is subjected to weak smoothing processing weaker (lower in level) than the smoothing processing performed in a case in which the reference figure pattern is to be created, may be used. There is a case where the position of the edge of the target figure pattern 12 can be extracted with high accuracy since noise is small when data subjected to the weak smoothing processing is used.

In the die-to-die inspection, for example, the outline 14a of the target figure pattern 12a (first figure pattern) of the mask die image (1) (first measurement image) is a reference outline and the outline 14b of the target figure pattern 12b (second figure pattern) of the mask die image (2) (second measurement image) of an object to be inspected is inspected.

In the positioning step (S210), the positioning unit 68 (alignment processing unit) performs the positioning (alignment) of the extracted outline 14a (reference outline) of the target figure pattern 12a (first figure pattern) of the mask die image (1) (first measurement image) and the extracted outline 14b of the target figure pattern 12b (second figure pattern) of the mask die image (2) (second measurement image). The positioning (alignment) is performed in sub-pixel.

In the comparison step (S220), the comparison unit 70 compares the outline 14a of the target figure pattern 12a (first figure pattern) of the mask die image (1) (first measurement image) with the outline 14b of the target figure pattern 12b (second figure pattern) of the mask die image (2) (second measurement image). Specifically, the comparison unit 70 operates as described below. As in the case illustrated in FIG. 8, the comparison unit 70 measures distances between a plurality of points 11" positioned on the outline 14a of the target figure pattern 12a (first figure pattern) of the mask die image (1) (first measurement image), which has been subjected to positioning (alignment), and the outline 14b of the target figure pattern 12b (second figure pattern) of the mask die image (2) (second measurement image), which has been subjected to positioning (alignment), in the normal direction of the outline 14a. It is preferred that the distance is measured in sub-pixel. Then, the comparison unit 70 determines that a defect is present at a portion where a distance exceeds a determination threshold value Th in the distances between the plurality of points 11" positioned on the outline 14a of the target figure pattern 12a (first figure pattern) of the mask die image (1) (first measurement image), which has been subjected to positioning, and the outline 14b of the target figure pattern 12b (second figure pattern) of the mask die image (2) (second measurement image)), which has been subjected to positioning, measured in the normal direction of the outline 14a. Comparison results may be output by the storage device 109, the monitor 117, the memory 118, or the printer 19.

As described above, in the die-to-die inspection, first, the reference outline creation unit 60 creates the reference outline 10' from data from which noise is removed through the smoothing processing performed on the mask die image (1) (first measurement image) defined by gradation values (pixel values) and changed into image data. Then, each of the edge of the target figure pattern 12a of the mask die image (1) (first measurement image) and the edge of the target figure pattern 12b of the mask die image (2) (second measurement image), which are defined by image data, is individually searched in the normal direction of the reference outline 10' from the plurality of points 11' that are positioned on the created reference outline 10' and serve as starting points. Accordingly, processing for matching the outline 14a of the target figure pattern 12a (first figure pattern) of the mask die image (1) (first measurement image) with the outline 14b of the target figure pattern 12b (second figure pattern) of the mask die image (2) (second measurement image) can be made not to be required.

According to the first embodiment, as described above, it is possible to create the outline of a measurement image without requiring matching processing for finding a correspondence relationship between two outline images. For this reason, the amount of processing required for the creation of an outline can be reduced. For example, repetitive arithmetic processing for optimizing the outline shape of an object from an initial outline by minimizing an energy term through repetitive optimization is performed in the matching processing. However, since search is performed in the normal direction of a reference outline from a plurality of points, which are positioned on the reference outline and serve as starting points, in the first embodiment, the amount of arithmetic processing to be required can be significantly reduced.

In the above description, a series of "~ circuits" include processing circuitry and the processing circuitry includes an electrical circuit, a computer, a processor, a circuit board, a quantum circuit, a semiconductor device, or the like. Further, common processing circuitry (the same processing circuitry) may be used as each "~ circuit". Alternatively, different processing circuitry (separate processing circuitry) may be used as each "~ circuit". Programs, which allow a processor and the like to be executed, may be recorded on a record carrier body, such as a magnetic disk device, a magnetic tape unit, FD, or Read-Only Memory (ROM). For example, each of the position circuit 107, the comparator circuit 108, the reference outline creation circuit 112, and the like may be formed of at least one of the above-mentioned processing circuitry.

The embodiment has been described above with reference to specific examples. However, the invention is not limited to these specific examples. A measurement image is acquired using electron beams (multiple beams 20) in the above-mentioned examples, but the invention is not limited thereto. The measurement image acquisition mechanism 150 may acquire a measurement image, which is the optical image of a figure pattern from the substrate 101 on which the figure pattern is formed, by using laser beams. In a case in which laser beams are used, transmitted light inspection may be applied or reflected light inspection may be applied.

Further, parts that are not directly required for the description of the invention, such as the configuration of the apparatus and control methods, are not described, but the required configuration of the apparatus and required controls methods can be appropriately selected and used.

In addition, all pattern inspection methods and pattern inspection apparatuses, which include components of the invention and can be appropriately modified in design by those skilled in the art, are included in the scope of the invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A pattern inspection apparatus comprising:
a measurement image acquisition mechanism including an emission source emitting electron beams or laser beams and an optical system irradiating a substrate on which the figure pattern is formed with the electron beams or the laser beams, and configured to acquire a measurement image, which is a secondary electron image or an optical image of a figure pattern, from the substrate by irradiating the substrate with the electron beams or the laser beams;
a reference outline creation processing circuit configured to create a reference outline of a reference figure pattern, which serves as a reference, by using pattern data of a design pattern that serves as a base of the figure pattern formed on the substrate;
an outline extraction processing circuit configured to extract an outline of the figure pattern in the measurement image from the measurement image using, as starting points, a plurality of points that are positioned on the reference outline; and
a comparison processing circuit configured to compare the reference outline with the outline of the figure pattern,
wherein the comparison processing circuit measures distances between the plurality of points positioned on the reference outline and the outline of the figure pattern in a normal direction of the reference outline, and determines that a defect is present at a portion where a distance exceeds a determination threshold value in the measured distances.

2. The apparatus according to claim 1, further comprising:
an alignment processing circuit configured to perform alignment of the reference outline and the outline of the figure pattern,
wherein the comparison processing circuit compares the reference outline subjected to the alignment and the outline of the figure pattern subjected to the alignment.

3. The apparatus according to claim 1,
wherein the reference outline creation processing circuit creates the reference outline of the reference figure pattern by using vector data as the pattern data of the design pattern.

4. A pattern inspection apparatus comprising:
a measurement image acquisition mechanism configured to acquire first and second measurement images, which are secondary electron images or optical images of same first and second figure patterns, from a substrate on which the same first and second figure patterns are formed at different positions by using electron beams or laser beams;
a reference outline creation processing circuit configured to create a reference outline of a reference figure pattern, which serves as a reference, by using the first measurement image of the first figure pattern;
a first outline extraction processing circuit configured to extract an outline of the first figure pattern in the first measurement image from the first measurement image using, as starting points, a plurality of points that are positioned on the reference outline;
a second outline extraction processing circuit configured to extract an outline of the second figure pattern in the second measurement image from the second measurement image using, as starting points, the plurality of points that are positioned on the reference outline; and
a comparison processing circuit configured to compare the outline of the first figure pattern with the outline of the second figure pattern,
wherein the comparison processing circuit measures distance between a plurality of points positioned on the outline of the first figure pattern and the outline of the second figure pattern in a normal direction of the outline of the first figure pattern, and determines that a defect is present at a portion where a distance exceeds a determination threshold value in the measured distances.

5. The apparatus according to claim 4, further comprising:
a smoothing processing circuit configured to perform smoothing processing for smoothing an end portion of the first figure pattern of the first measurement image;
wherein the reference outline creation processing circuit creates the reference outline by using the first figure pattern, which has been subjected to the smoothing processing, as the reference figure pattern.

6. The apparatus according to claim 4, further comprising:
an alignment processing circuit configured to perform alignment of the outline of the first figure pattern and the outline of the second figure pattern,
wherein the comparison processing circuit compares the outline of the first figure pattern subjected to the alignment and the outline of the second figure pattern subjected to the alignment.

7. A pattern inspection method comprising:
acquiring a measurement image, which is a secondary electron image or an optical image of a figure pattern, from a substrate on which the figure pattern is formed by using electron beams or laser beams;
creating a reference outline of a reference figure pattern, which serves as a reference of the figure pattern of the measurement image, by using pattern data of a design pattern that serves as a base of the figure pattern formed on the substrate;
extracting an outline of the figure pattern in the measured image from the measured image using, as starting points, a plurality of points that are positioned on the reference outline; and
comparing the reference outline with the outline of the figure pattern and outputting results,
wherein distances between the plurality of points positioned on the reference outline and the outline of the figure pattern in a normal direction of the reference outline are measured, and it is determined that a defect is present at a portion where a distance exceeds a determination threshold value in the measured distances.

8. A pattern inspection method comprising:
acquiring first and second measurement images, which are secondary electron images or optical images of same first and second figure patterns, from a substrate on which the same first and second figure patterns are formed at different positions by using electron beams or laser beams;
creating a reference outline of a reference figure pattern, which serves as a reference, by using the first measurement image of the first figure pattern;
extracting an outline of the first figure pattern in the first measurement image from the first measurement image using, as starting points, a plurality of points that are positioned on the reference outline;
extracting an outline of the second figure pattern in the second measurement image from the second measurement image using, as starting points, the plurality of points that are positioned on the reference outline; and
comparing the outline of the first figure pattern with the outline of the second figure pattern and outputting results,
wherein distances between a plurality of points positioned on the outline of the first figure pattern and the outline of the second figure pattern in a normal direction of the outline of the first figure pattern are measured, and it is determined that a defect is present at a portion where a distance exceeds a determination threshold value in the measured distances.

* * * * *